United States Patent [19]

Doss-Desouza

[11] Patent Number: 5,558,804
[45] Date of Patent: Sep. 24, 1996

[54] VIBRATION DAMPING MOUNTING

[75] Inventor: Argus Doss-Desouza, Shatin, Hong Kong

[73] Assignee: Nokia Mobile Phones Ltd., Salo, Finland

[21] Appl. No.: 323,266

[22] Filed: Oct. 14, 1994

[30] Foreign Application Priority Data

Oct. 16, 1993 [GB] United Kingdom .................. 9321388

[51] Int. Cl.⁶ ................................................... F16M 13/00
[52] U.S. Cl. ........................................... 248/634; 248/562
[58] Field of Search ................................ 248/205.3, 550, 248/564, 631, 634, 635, 638, 309.1, 562

[56] References Cited

U.S. PATENT DOCUMENTS

| | | | |
|---|---|---|---|
| 1,372,991 | 3/1921 | Beadle | 248/167 |
| 2,442,754 | 6/1948 | Beam | 248/634 X |
| 2,926,881 | 3/1960 | Painter | 267/141.4 |
| 3,250,502 | 5/1966 | Robinson | 248/560 |
| 4,216,505 | 8/1980 | Grant et al. | 360/104 |
| 4,326,693 | 4/1982 | Noble | 248/635 |

FOREIGN PATENT DOCUMENTS

| | | |
|---|---|---|
| 581803 | 10/1946 | United Kingdom . |
| 755273 | 8/1956 | United Kingdom . |
| 1058671 | 2/1967 | United Kingdom . |
| 1109760 | 4/1968 | United Kingdom . |
| 1251895 | 11/1971 | United Kingdom . |
| 1254740 | 11/1971 | United Kingdom . |

*Primary Examiner*—Karen J. Chotkowski
*Assistant Examiner*—Anita M. King
*Attorney, Agent, or Firm*—Perman & Green

[57] ABSTRACT

The invention relates to a vibration damping mounting comprising a body portion adapted for attachment to a load and including a mounting surface having a resilient member coupled thereto. The resilient member is adapted to exert a substantially equivalent restoring force on the body portion for substantially all directions of the load continuous or discontinuous. This results in the vibration damping being substantially constant over all orientations of the load.

16 Claims, 4 Drawing Sheets

5,558,804

VIBRATION DAMPING MOUNTING

FIELD OF THE INVENTION

This invention relates to a vibration damping mounting comprising a body portion adapted for attachment to a load and including a mounting surface having a resilient member fixed thereto.

BACKGROUND OF THE INVENTION

In mobile communication systems a radio telephone or the like is often supported in a cradle mounted on the control console or like of a vehicle in which the radio telephone user is travelling. An example of such a cradle is given in British Patent application GB 2 243 049. The cradle comprises a mounting bracket which is pivotally connected to the cradle by a conventional ball and socket arrangement. The ball and socket arrangement are each fixedly connected to either one or other of the cradle or mounting bracket. At certain speeds and under certain conditions the vibrations of the vehicle can cause the radio telephone to rattle and move about in its cradle, causing noise, possibly damage to the radio telephone and at worse causing the radio telephone to come out of the cradle. Thus, there is a particular requirement for a vibration damping mounting in mobile communication systems. Due to the fact that different radio telephone users prefer their radio telephone mounted in different orientations, a vibration damping mounting suitable for use with a radio telephone must have the same damping characteristics irrespective of the orientation in which the radiotelephone is mounted.

BRIEF SUMMARY OF THE INVENTION

The present invention provides a vibration damping mounting, comprising a body portion adapted for attachment to a load and including a mounting surface having a resilient member fixed thereto, wherein the resilient member is adapted to exert a substantially equivalent restoring force on the body portion for substantially all directions of the load and forms a cantilever with the body portion the cantilever being supported at one end by the mounting surface and having a free end attached to the load thereby translating linear movement of the load to rotational movement. This has the advantage that the vibration damping mounting is simple, can be made small and light and is easy to fabricate, yet provides substantially equivalent vibration damping for all orientations of the load. Furthermore, motion of the body portion is translated to rotary motion.

Advantageously, the resilient member has a height to width aspect ratio in the range ½ to 2. Such an aspect ratio provides the requisite expansion/compression to provide adequate vibration damping. Such a configuration optimises the amount of resilient material having a given compressibility/restoring force used in the vibration damping/mounting.

Typically, the resilient member is in the form of an annulus. This has the advantage that relatively less of the resilient material is used and it is possible to provide access to the rear of the body portion to facilitate attaching the load thereto.

Suitably, the resilient member comprises foam, which is a relatively cheap, easily available and workable material. Additionally foam has a low density and therefore does not store vibrational energy (has a low Q) which inhibits the transmission of vibrations through the foam arid to the body portion. Optionally, the resilient material comprises an elastomer such as synthetic rubber or the like, or a styrenic thermoplastic, which have similar advantages as foam although they are not as light.

Preferably the resilient member comprises a plurality of segments.

This has the advantage in that it lowers the weight of the mounting and also results in a more compressible resilient material for a given hardness of material. Thus it would be possible to fabricate a vibration damping mounting from a hard, durable, resilient material also having the requisite compressibility to provide adequate damping. Typically, respective segments are disposed at the corners of the mounting surface and the body portion.

Advantageously, the mounting comprises restraining means such as snubbers, which inhibit excess movement of the body portion relative to the mounting surface. This is particularly useful for inhibiting overstressing of the resilient member when a radio telephone is being placed in or removed from a holder supported by the mounting, or during assembly of the mounting.

The resilient member has a Rockwell hardness number in the range 6 to 12, which is suitable for ensuring that the vibration damping mounting satisfies the requirements of various approval agencies, in particular the CTIA in the U.S.A.

In a particular embodiment the split elastomer comprises segments which are not evenly or symmetrically spaced or sized. This arrangement optimises the durability of the vibration damping mounting and the effectiveness of vibration damping. Furthermore, if the size of the segments are irregular then mechanical resonances can be inhibited.

Specific embodiments of the invention will now be described by way of example only, and with reference to the accompanying drawings in which;

DETAILED DESCRIPTION OF EMBODIMENTS OF THE INVENTION

As described earlier, it is desirable that the mountings for holding cradles for car phones are capable of damping vibrations. Previously, phone cradles have been rigidly mounted.

Figure 1:
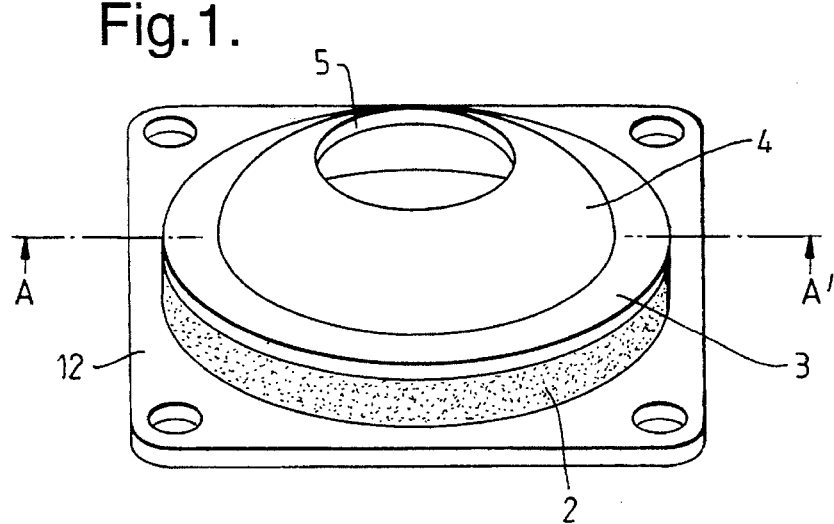
FIG. 1 shows a perspective view of a first embodiment of the invention.

FIG. 1 shows a first embodiment of the invention. The mounting 1, comprises a substantially hemispherical protrusion (4) which forms the ball of a "ball and socket" arrangement attached to a cradle, a flange 3, a resilient member 2 and a hole 5 for facilitating attachment of the cradle to the mounting. The resilient member 2 is made from foam and forms an annular ring as can be seen from FIGS. 2 and 3. One type of foam used is known as expanded neoprene and has a density in the range 1–2 kg/m$^3$. It is formed into a ring in order to permit access to the interior of hemisphere 4 and to save on material. A cross-sectional view of the invention is shown in FIG. 3, which clearly shows the position of the foam 2 relative to the hemisphere 4 and flange 3. As can be seen from FIG. 8, the phone 9 is mounted in the cradle 8 at the free end of a cantilever comprising a mounting bracket 12, the foam 2, hemisphere 4 and the cradle 8. Thus, vibration or movement in a direction substantially parallel to the mounting plane results in a turning moment which acts to compress or expand respective parts of the foam 2. Additionally, when the cradle is mounted such that it lies substantially perpendicular to vibrations, the foam 2 also undergoes compression/expansion when damping the vibrations. Thus, similar mechanisms (i.e. compression/expansion of the foam) act 'to damp' vibrations for all orientations of the phone. For a foam 2 having a constant restoring force in both compression and expansion, the phone undergoes the same damping no matter what its orientation.

Figure 2:
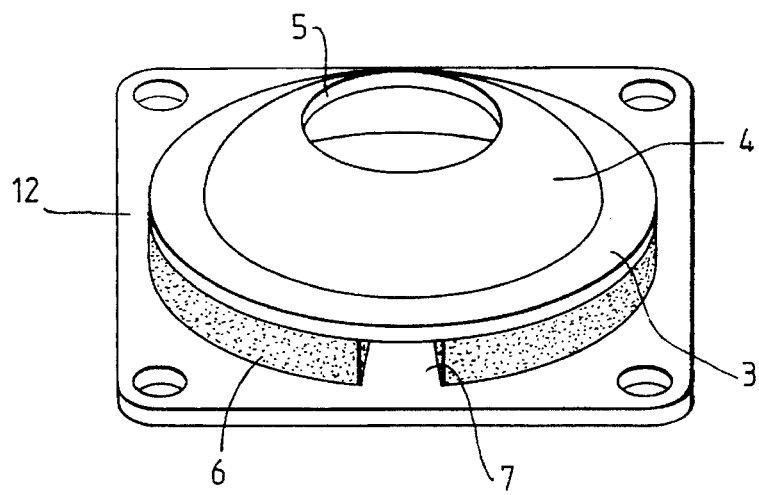
FIG. 2 shows a cross-section through A—A' of FIG. 1.
Figure 3:
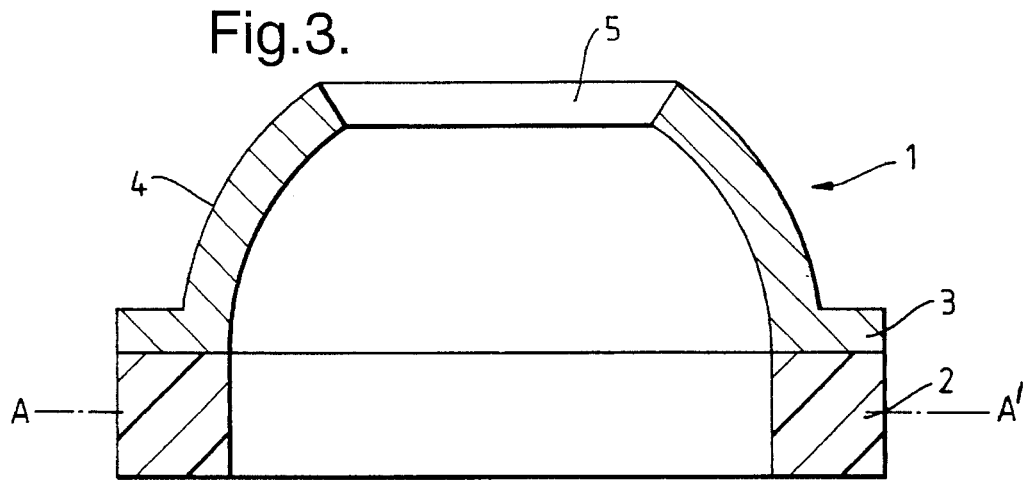
FIG. 3 shows a perspective view of a second embodiment of the invention.

Another embodiment of the invention which works in a similar way is shown in FIG. 2. In this embodiment the resilient material is an elastomer 6 and is divided into segments having gaps 7 separating the individual segments. In this embodiment an elastomer 6 is used because it can be suitably chosen to be harder than foam and is therefore more durable. However, the harder a substance the greater the transfer of vibrations through it. Since the compressibility of a material is proportional to the cross-sectional area supporting the compressive load, a hard material can be made more compressible by reducing its load bearing cross-section. Thus, the relatively hard elastomer 6 is segmented to increase its compressibility, thereby providing enhanced vibration damping, whilst being relatively durable.

Figure 4:
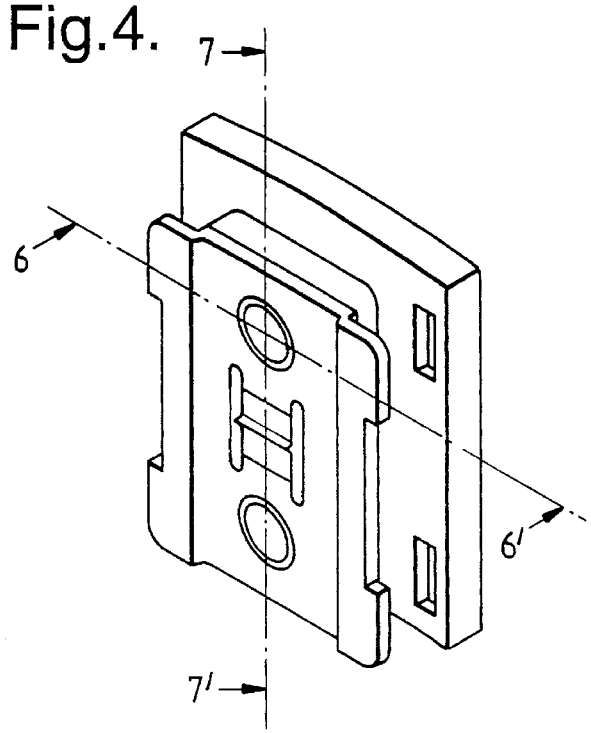
FIG. 4 shows perspective view of a third embodiment of the invention.
Figure 5:
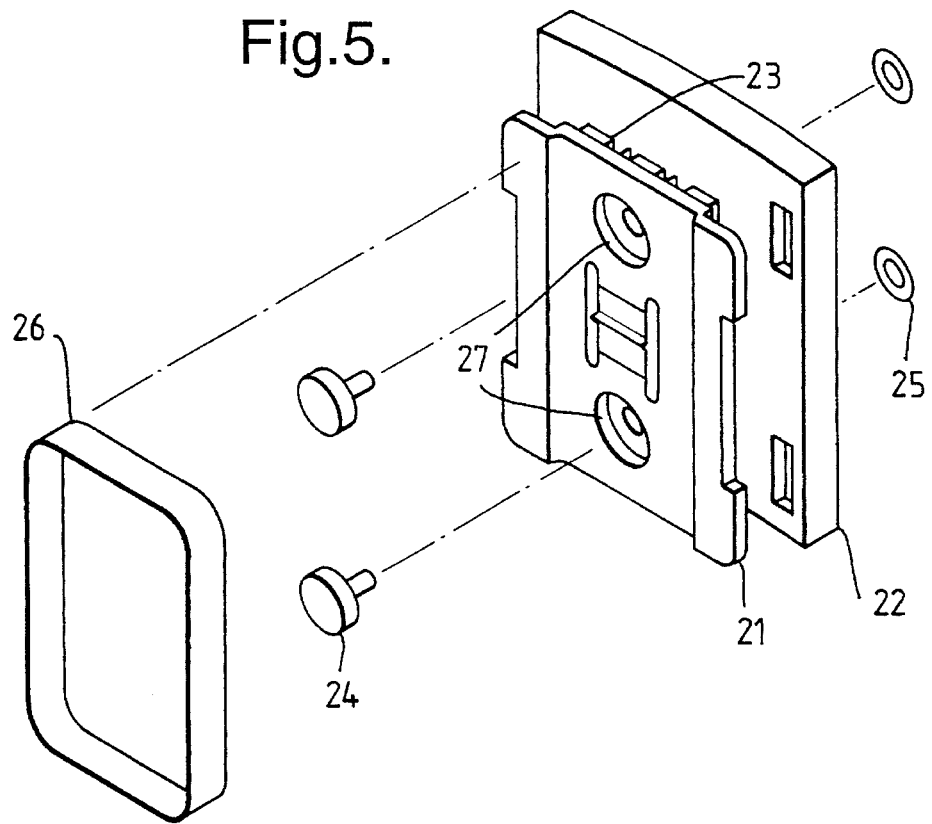
FIG. 5 shows an exploded perspective view of a third embodiment of the invention.
Figure 6:
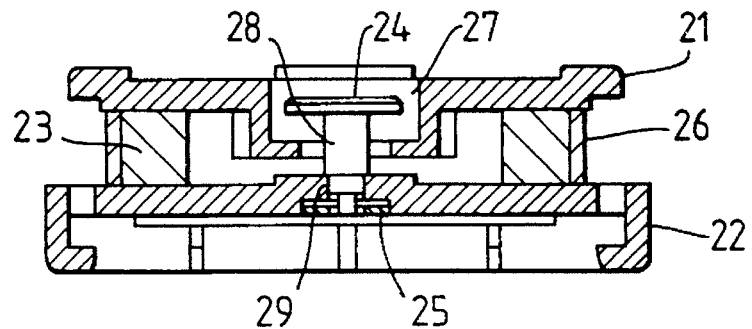
FIG. 6 shows a cross-section through 6—6' of FIG. 4.
Figure 7:
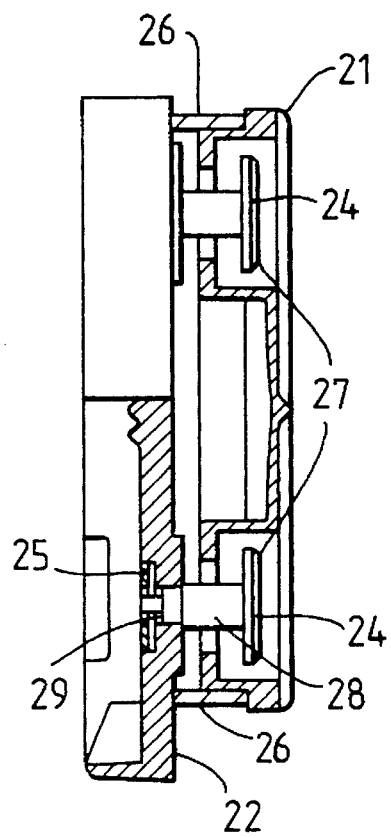
FIG. 7 shows a cross-section through 7—7' of FIG. 4.

FIG. 4 shows a third embodiment of the present invention which comprises a number of parts. The mounting is shown in exploded view in FIG. 5. The mounting assembly comprises a body portion 21 and a mounting surface 22 mechanically coupled to each other by four elastomer blocks 23. The elastomer blocks are 9 mm long, 6 mm wide and 5 mm high. The body portion 21 and mounting surface 22 are rectangular in shape with the mounting surface 22 being larger than the body portion. Referring also to FIGS. 6 and 7, an elastomer block 23 is disposed at each corner of the body portion 21 and mounting surface 22. Two countersunk holes 27 are disposed in the body portion and are dimensioned to each receive a brass snubber 24. The snubbers have a flat head and a rod portion 28 which protrudes into a receiving hole 29 disposed in the mounting surface 22 when the mounting is assembled. The snubbers 24 are held in place by peening their protruding end over washers 25. As can be seen from FIGS. 6 and 7, the snubbers permit the body portion 21 to have limited movement but inhibit excess movement likely to damage the elastomer blocks or their fixing to the body portion 21 or mounting surface 22.

Figure 8:
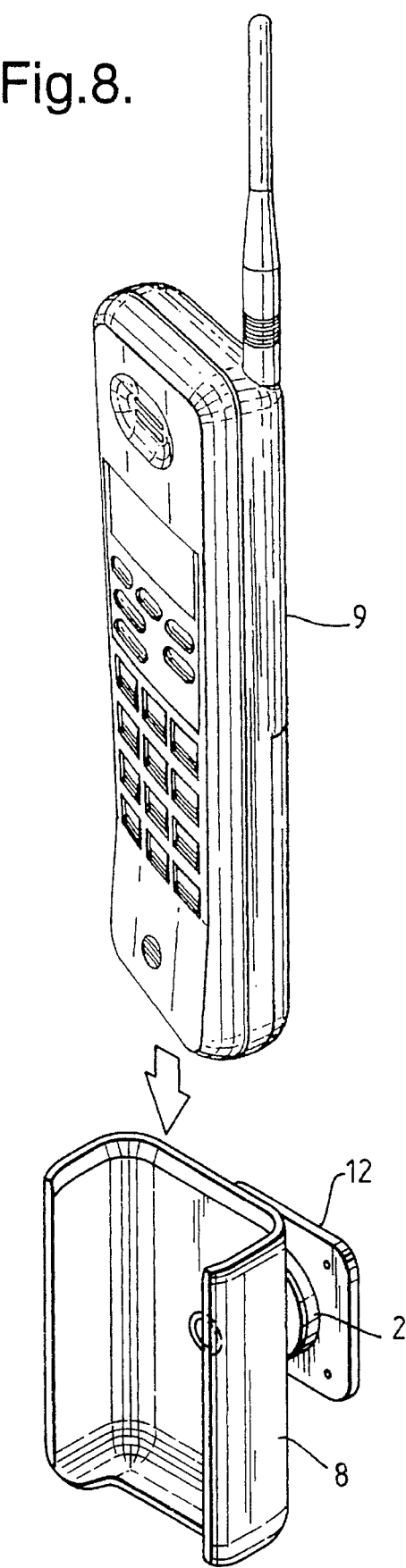
FIG. 8 shows a perspective view of an embodiment of the invention for holding a radio telephone.

The open sides of the assembly are enclosed by rubber band 26 or the like. The mounting surface 22 can be interlocked with a plate or other device which is rigidly mounted to a part of a vehicle, such as the dash board. The body portion 21 can be fixed or interlocked with an in-car telephone holder 8 into which a telephone may be inserted as shown in FIG. 8.

The effect of the elastomeric blocks is to provide a substantially equal damping effect in all axes and rotationally when a vibration is applied to the mounting. In particular, when using a styrenic thermoplastic material as the elastomer shear forces on the elastomer blocks are significant in acting to damp vibrations.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claim may be formulated to such features during prosecution of this application or of any such further application derived therefrom.

What we claim is:

1. A vibration damping mounting comprising a substantially rectangular body portion adapted for attachment to a load and including a substantially rectangular mounting surface having resilient spacers fixed thereto substantially at each corner of said rectangular body portion and said mounting surface, restraining means for inhibiting excess movement of the body portion relative to the mounting surface, and a resilient loop enclosing open sides between the body portion and the mounting surface, wherein said resilient spacers are adapted to exert a substantially equivalent restoring force on said body portion for substantially all directions of the load.

2. A mounting according to claim 1, wherein the resilient spacers form a cantilever with the body portion said cantilever being supported at one end by said mounting surface and having a free end attachable to the load thereby translating linear movement of said load to rotational movement.

3. A mounting according to claim 1, wherein the resilient spacers comprises foam.

4. A mounting according to claim 1, wherein the resilient spacers comprises an elastomer.

5. A mounting according to claim 1, wherein the resilient spacers comprises a styrenic thermoplastic.

6. A mounting according to claim 1, wherein the resilient members have a Rockwell hardness number in the range 6 to 12.

7. A mounting according to claim 1, wherein the resilient members have a shore hardness in the range 21 to 25.

8. A mounting according to claim 1, wherein the spacers have lengths in the range 8 to 90 mm.

9. A vibration damping mounting assembly comprising:

a mounting surface;

a body portion connected to the mounting surface by deformable resilient spacers; and means for limiting movement of the body portion relative to the mounting surface comprising posts extending from the mounting surface through countersunk holes in the body portion, the posts and holes being spaced from the spacers, wherein the posts are smaller than the holes such that sides of the body portion in the holes are spaced from the posts, but the sides of the body portion in the holes contact the posts when the body portion is moved relative to the mounting surface to thereby limit relative movement of the body portion on the mounting surface and prevent excessive deformation of the resilient spacers.

10. An assembly in claim 9 wherein the posts have heads located in a large section of the countersunk holes that are larger than a smaller section of the holes to limit movement of the body portion relative to the mounting surface in an axial direction relative to the posts.

11. An assembly as in claim 10 wherein the posts comprise snubbers fixedly and stationarily connected to the mounting surface.

12. An assembly as in claim 9 further comprising a single rubber band loop enclosing open sides of the assembly between the mounting surface and the body portion.

13. A vibration damping mounting assembly comprising:

a mounting surface having stationary cantilevered posts extending therefrom;

deformable resilient spacers attached to the mounting surface;

a body portion attached to the resilient spacers and having the posts extending into holes of the body portion, the posts being spaced from the body portion in the holes wherein the body portion can be moved relative to the mounting surface in all directions by deformation of the spacers and is stopped from excessively deforming the spacers when the body portion contacts the posts; and a single resilient deflectable loop enclosing an open area between the mounting surface and the body portion.

14. An assembly as in claim 13 wherein the holes in the body portion are countersunk holes.

15. An assembly as in claim 13 wherein the posts comprise snubbers fixedly and stationarily connected to the mounting surface.

16. An assembly as in claim 13 wherein the spacers comprise four blocks located at four corners of the body portion.

* * * * *